United States Patent [19]
Kikuchi

[11] Patent Number: 6,043,906
[45] Date of Patent: Mar. 28, 2000

[54] ORGINAL READING APPARATUS HAVING TEMPERATURE DETECTOR AND CONTROL METHOD THEREOF

[75] Inventor: Naoyuki Kikuchi, Gifu, Japan

[73] Assignee: Sanyo Electric Co., Ltd, Moriguchi, Japan

[21] Appl. No.: 08/958,572

[22] Filed: Oct. 28, 1997

[30] Foreign Application Priority Data

Oct. 29, 1996 [JP] Japan .................................. 8-286219

[51] Int. Cl.$^7$ ...................................................... H04N 1/04

[52] U.S. Cl. ........................ 358/475; 358/406; 358/498; 358/496; 399/51; 355/30

[58] Field of Search ..................................... 358/498, 496, 358/497, 494, 474, 475, 406; 399/51; 355/30

[56] References Cited

U.S. PATENT DOCUMENTS

| | | | |
|---|---|---|---|
| 5,726,774 | 3/1998 | Shishido et al. | 358/475 |
| 5,797,066 | 8/1998 | Kishigami et al. | 358/497 |

*Primary Examiner*—Edward L. Coles
*Assistant Examiner*—Cheukfan Lee
*Attorney, Agent, or Firm*—Darby & Darby

[57] ABSTRACT

An original reading apparatus includes a thermistor that is arranged close to a reading position. When the output of the thermistor represents a warning temperature range, a CPU activates a cooling fan after waiting for completion of an automatic document feeding (ADF) copy operation being performed. When the output of the thermistor represents a proper temperature range due to the operation of the cooling fan, a state of enabling the ADF copy operation is restored. If the output of the thermistor exhibits an abnormal temperature range due to a cause of a failure in the cooling fan or the like, the CPU immediately stops all the operations.

16 Claims, 8 Drawing Sheets

ORGINAL READING APPARATUS HAVING TEMPERATURE DETECTOR AND CONTROL METHOD THEREOF

BACKGROUND OF THE INVENTION

1. Field of the Invention

This invention relates to an original reading apparatus and control method therefor. More particularly, this invention is concerned with an original reading apparatus, which is applicable to a facsimile provided with a copy function and includes an automatic document feeder (ADF) for feeding an original that is placed at a given position (paper feeding tray) to a reading position and a light emitting means (heat-generating light source) for radiating light to an original readout surface, and method for controlling the apparatus.

2. Description of the Prior Art

In a conventional original reading apparatus of this kind, a plurality of originals placed on a paper feeding tray are fed, one by one, to a reading position through the use of so-called an automatic document feeding (ADF) function. The original fed to the reading position is illuminated with light by a heat-generating light source such as a halogen lamp, so as to be optically read (or photocopied) at its readout surface. In case where this ADF copy mode is designated, the halogen lamp is lit at a fixed position so that the original, with its readout surface faced down, is moved on a glass platen by means of the ADF function.

This, however, has raised a problem that component parts disposed close to the reading position, such as a glass platen and parts provided therearound, are heated up to an excessive extent due to the heat generated by the halogen lamp.

To cope with this, the conventional apparatus has been structured to detect a temperature of a portion illuminated by the halogen lamp. That is, if the temperature rises to an extent that reading of an original is badly influenced or the component parts, etc. are thermally deformed (i.e. to an abnormal temperature), operations such as feeding, reading, printing of the original and the like are promptly suspended so that no starting of the apparatus is available unless the power thereof is again turned on.

In an original reading apparatus having both copy and facsimile functions, however, where the temperature detected reaches an abnormal temperature in a state that the reading apparatus is waiting for printing the received data on a recording sheet (facsimile sheet), i.e. in a state that received data is stored in a memory, the power had to temporarily be turned off despite the presence of received data in waiting for being printed. To this end, there has been a problem that the facsimile reception data stored within the memory be vanished without being printed out.

SUMMARY OF THE INVENTION

It is therefore a primary object of the present invention to provide a novel original reading apparatus.

It is another object of the present invention to provide an original reading apparatus which is capable of preventing from being excessively heated up due to a halogen lamp arranged therein while avoiding disappearance of facsimile reception data stored within a memory, and a control method therefor.

An original reading apparatus according to the present invention comprises: an paper feeding means for feeding an original to first and second reading positions, a first light emitting means for radiating up first light to a readout surface of an original positioned at the first reading position, a second light emitting means for radiating second light to the readout surface of the original positioned at the second reading position, a temperature detecting means for detecting a temperature detecting position that is in the vicinity of the first reading position and radiated by the second light, a determining means for determining whether or not a result of detection by the temperature detecting means lies within an operation-prohibiting range, a disabling means for disabling at least the fist light emitting means based on a result of determination by the determining means, and a cooling means for cooling the position radiated by the first light based on the result of determination by the determining means.

A control means according to this invention, applicable to an original reading apparatus, having a paper feeding means for feeding an original to first and second reading positions, a first light emitting means for radiating first light to a readout surface of an original positioned at a first reading position, and a second light emitting means for radiating second light to the readout surface of the original positioned at a second reading position, includes the step of: (a) a step of detecting a temperature at a temperature detecting position that is in the vicinity of the first reading position and radiated by the first light, (b) a step of determining whether or not a result of detection by the step (a) falls within an operation-prohibiting temperature range, (c) a step of disabling at least the first light emitting means based on the result of determination by the step (b), and (d) a step of cooling the position illuminated by the first light based on the result of determination by the step (b). If the first light emitting means (heat-generating light source, e.g. a halogen lamp) in a fixed state is lit and so-called an ADF analog copy mode for transporting the original in succession from the first reading position, the temperature detecting means detects a temperature at the predetermined temperature detecting position. The determining means determines, based on the result of detection, whether or not the temperature at the temperature detecting position is within an operation-prohibiting temperature range, that is, the determining means determines whether the detected temperature falls within a warning temperature range or within an abnormal temperature range.

Where the detected temperature is within the warning temperature range, the copy operation being performed is waited for its completion (i.e. discharge of the original or printing on a recording paper) so as to disable at least the halogen lamp as the first emitting means by the disabling means, and enable the cooling means. When the temperature at or in the vicinity of the first reading position is shifted from the warning temperature range to a proper temperature range by the cooling means, the disabled state of the halogen lamp, etc. is cancelled.

Incidentally, when there is an input of instruction information for activating the second light emitting means- such as in facsimile original transmission (reading) or for designating digital copying, it is possible to carry out a required digital process operation even in a duration that the halogen lamp is disabled (the cooling means is activated).

Meanwhile, where it is determined by the determining means that the temperature in the vicinity of the first reading position falls within the abnormal temperature range by the determining means, all the operation are immediately suspended to give notification abnormality on the apparatus to the operator.

According to the present invention, where the temperature inside the apparatus is heated up due to the first light by the first light emitting means, operations such as original reading are temporarily suspended so that analog copy operation is restored after the temperature inside the apparatus is lowered down to a proper temperature. Therefore, there is no necessity of reputting (resetting) the power, differently from the conventional apparatus. Therefore, there is no fear of disappearance of the facsimile reception data stored in the memory.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
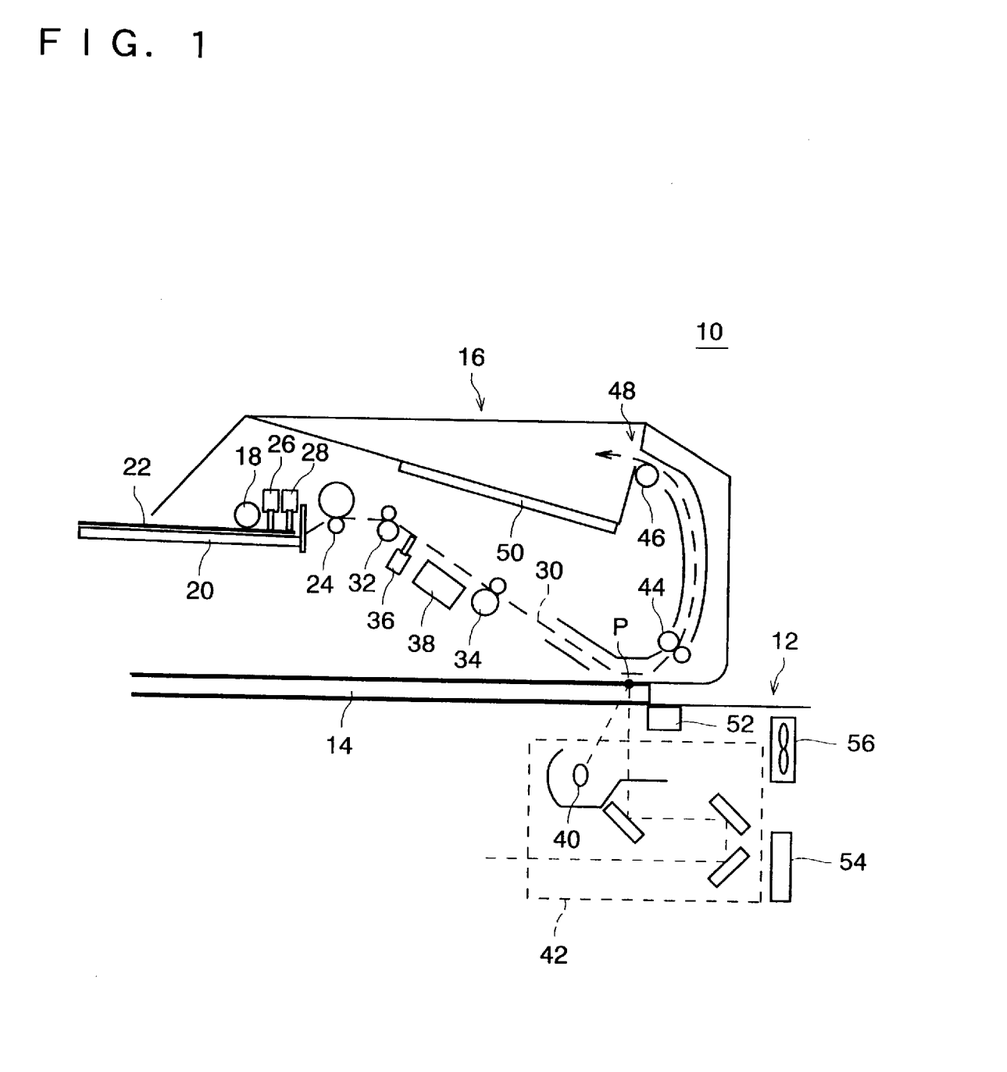
FIG. 1 is an illustrative view showing one embodiment of the present invention.

Referring to FIG. 1, an original reading apparatus 10 according to this embodiment includes a paper feeding device 16 that is provided above an apparatus main body 12 in a manner of covering an upper surface of a glass platen 14.

The paper feeding apparatus 16 includes a separator 18 which is driven by the force applied through a motor, not shown. By driving the separator 18, originals 22 rested, with its readout surfaces faced downward, in a paper feeding tray 20 are guided in order from the above by a pair of feed rollers 24. That is, the paper feeding apparatus 16 has an ADF function, and hence, the original feeding apparatus 16 constitutes an original feeding means.

Between the separator 18 and the pair of feed rollers 24, there arranged are an ADF sensor 26 for detecting whether or not the original 22 is placed on the paper feeding tray 20, and a size sensor 28 for detecting the size (A4, etc.) of the original 22. After the ADF sensor 26 detects the presence or absence of the original 22 and the size sensor 28 detects the size of the original 22, when instruction information to start original reading is supplied to the apparatus main body 12 through key inputting or the like, the separator 18 and the feed roller pair 24 are driven through a motor, not shown. Thus, the original 22 in the paper feeding tray 20 is transported through a given original feed path 30.

An original sensor 36 and a contact image sensor 38 are arranged between the pair of the feed rollers 32 and 34 (second reading position). The original sensor 36 detects the feeding of the original 22 to the contact image sensor (hereinafter abbreviated as "CIS"), i.e. detects the tip of the original 22. On the other hand, the CIS 38 constitutes an original reading means for outputting an electric signal for a black or white dot, i.e. image data, depending upon the density of the portion on the original 22 detected by the CIS 38. Incidentally, a light source provided at a second reading position is formed for example by a light emitting diode array (not shown) for illuminating the readout surface of the original 22 fed thereto.

When the CIS 38 is not selected as a means for reading the original 22, that is, when the analog copy mode is designated, instead of the digital copy mode, through key inputting or the like, the readout surface of the original 22 is optically read at a first reading position (see FIG. 1) denoted by a dot P located downstream of the CIS 38 (or the feed roller pair 34) with respect to the direction of transporting the original 22. That is, the original 22 is radiated at its readout surface by a halogen lamp 40 as a first light emitting means, which causes the optical image on the original 22 to be exposed onto a photosensitive material, not shown. Thus, an electrostatic latent image is formed, from the original image, on a surface of the photosensitive material. This electrostatic latent image is developed into a toner image form.

The original 22, whose readout surface has read by one of the original reading portion 42 having the halogen lamp 40 and the CIS 38, is discharged by the feed roller pair 44 and the discharge roller 46 to an exit paper tray 50 through an exit port 48.

In the conventional original reading apparatus, however, there has been a case that, when the ADF analog copy mode is designated, the halogen lamp is kept in a lit state at a given fixed position, resulting in local rise in temperature inside the apparatus. In other words, the halogen lamp was so arranged that the light emitted is focused at the first reading position (point P). Consequently, the glass platen 14 and other structural components placed at or in the vicinity of the first reading position were severely heated up. This has resulted in a problem that the reading of an original is badly affected on or thermal deformation takes place in such a structural component that is formed of a synthetic resin, etc. comparatively low in thermal resistance.

On the contrary, the original reading apparatus 10 of this embodiment has a thermistor 52 as a temperature detecting means arranged at a location that is close to the first reading position (point P) to be radiated of light by the halogen lamp 40. The operations such as reading of originals can be controlled by the CPU 54 based on the output (result of detection) of the thermistor 52.

Specifically, when the output of the thermistor 52 falls within an operation-prohibiting range, the CPU 54 stops (disables) all of the operations using the halogen lamp 40. At this time, the CPU 54 outputs, to a cooling fan (cooling means) 56, instruction information for starting the cooling for the portion radiated (heated) by the halogen lamp 40.

Here, the operation-prohibiting temperature range means a range including a warning temperature range and an abnormal temperature range. The warning temperature range, the abnormal temperature range and an appropriate temperature range are set such that they fulfill characteristics shown by the graph in FIG. 8. That is, the appropriate temperature range means a temperature range wherein the apparatus can exhibit its own function to a full extent. The warning temperature range is a temperature range wherein there is a possibility that the apparatus looses its own function. The abnormal temperature range is a temperature range wherein, if the apparatus be continuously operated, the apparatus may suffer from serious damage.

Figure 2:
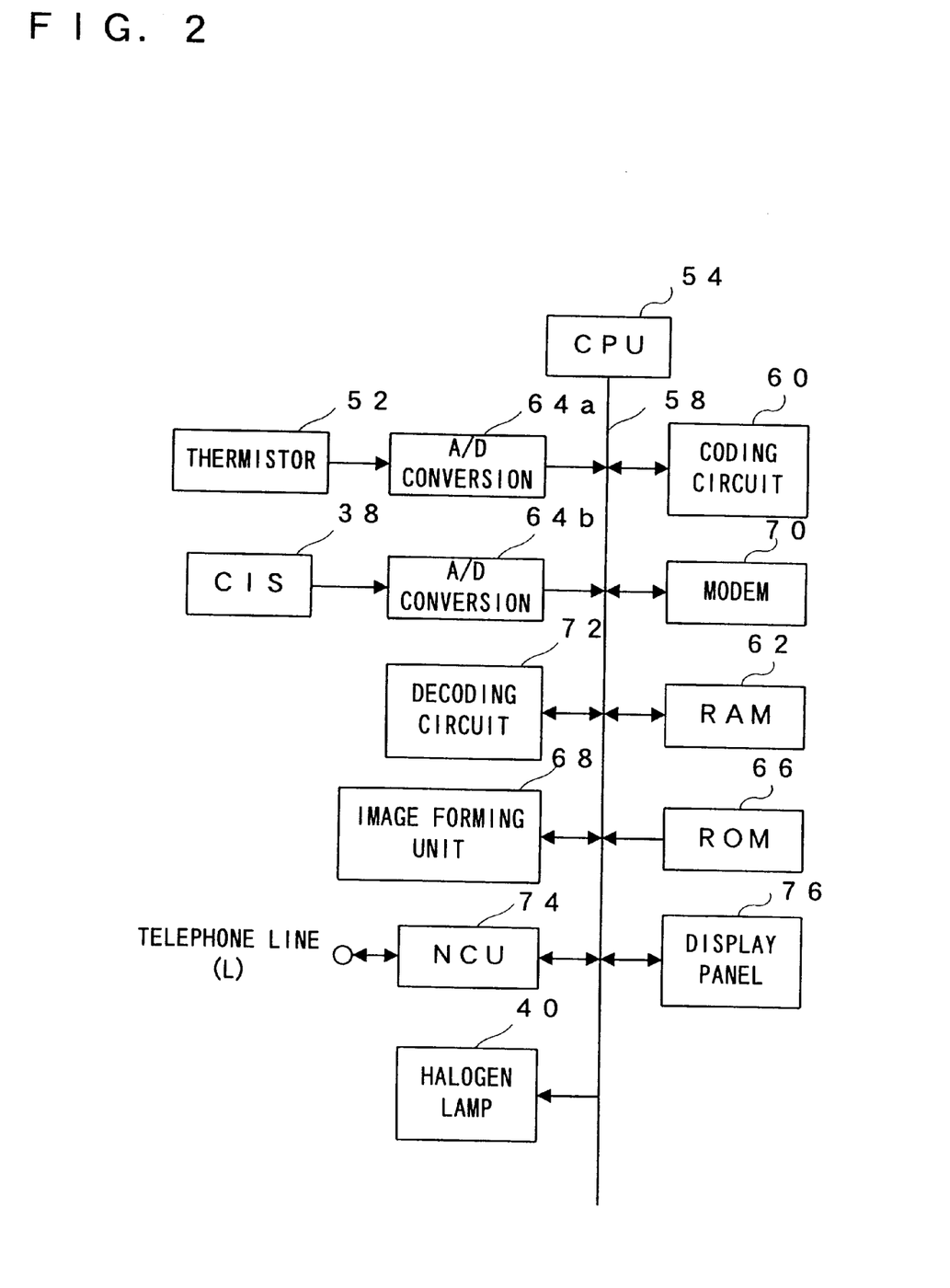
FIG. 2 is a block diagram showing an overall arrangement of the FIG. 1 embodiment.

FIG. 2 is a block diagram of the FIG. 1 embodiment, wherein the CPU 54 and other components are coupled through a bus 58. An encoding circuit 60 converts one line of data supplied from the CIS 38 into an MH (Modified Haffmann) code that is delivered to a RAM 62. Accordingly, the RAM 62 is structured to store with the MH code line by line. This MH code is added with a fill data code by the CPU 54, and then delivered to a modem, not shown, through an FIFO configuration.

The RAM 62 further includes a bit-map-schemed line buffer (not shown) and a flag area (not shown). The line buffer is written with facsimile reception data supplied via a telephone line L. On the other hand, the flag area includes a detection temperature flag A for representing whether or not the temperature detected by the thermistor 52 resides within the operation-prohibiting temperature range. That is, A="0" represents within the proper temperature range, A="1" within the warning temperature range, and A="2" within the abnormal temperature range. The respective outputs of the CIS 38 and the thermistor 52 are binarily quantized by A/D converters 64a and 64b.

The ROM 66 includes a control program area and a message data area. The control program area has a control program to be executed according to a flowchart, hereinafter referred to. The message data area is for storing with message data, i.e. data for providing a message (visible message).

An image forming unit 68 is for printing reception data on a recording paper (facsimile paper) during facsimile receiving operation. The image forming unit 68 includes for example a semiconductor laser (not shown) as an optical-writing light source. The output, or the laser beam, of the semiconductor laser is modulated according to the reception data. The laser beam is transmitted via polygon scanner and an optical focusing system, etc. onto a photosensitive material, not shown, so that an electrostatic latent image is formed on the photosensitive material. This electrostatic latent image is turned into a hardcopy on the recording paper through an ordinary electrophotography process.

A modulation/demodulation circuit 70 is a circuit for converting a signal into a signal suited for line transmission, while a decoding circuit 72 serves to decode the reception data. An NCU (network control unit) 74 is connected to the telephone line L to make confirmation on functions between two original reading apparatuses (facsimile machines) by transmitting a FAX signal back to a caller side and so on. The NCU 74 also sets a communication speed for enabling data transmission and reception. A display panel 76 is formed for example by a liquid crystal display (LCD) so that the CPU 54 indicates a message such as "NO SHEET" on the display panel 76.

Figure 3:
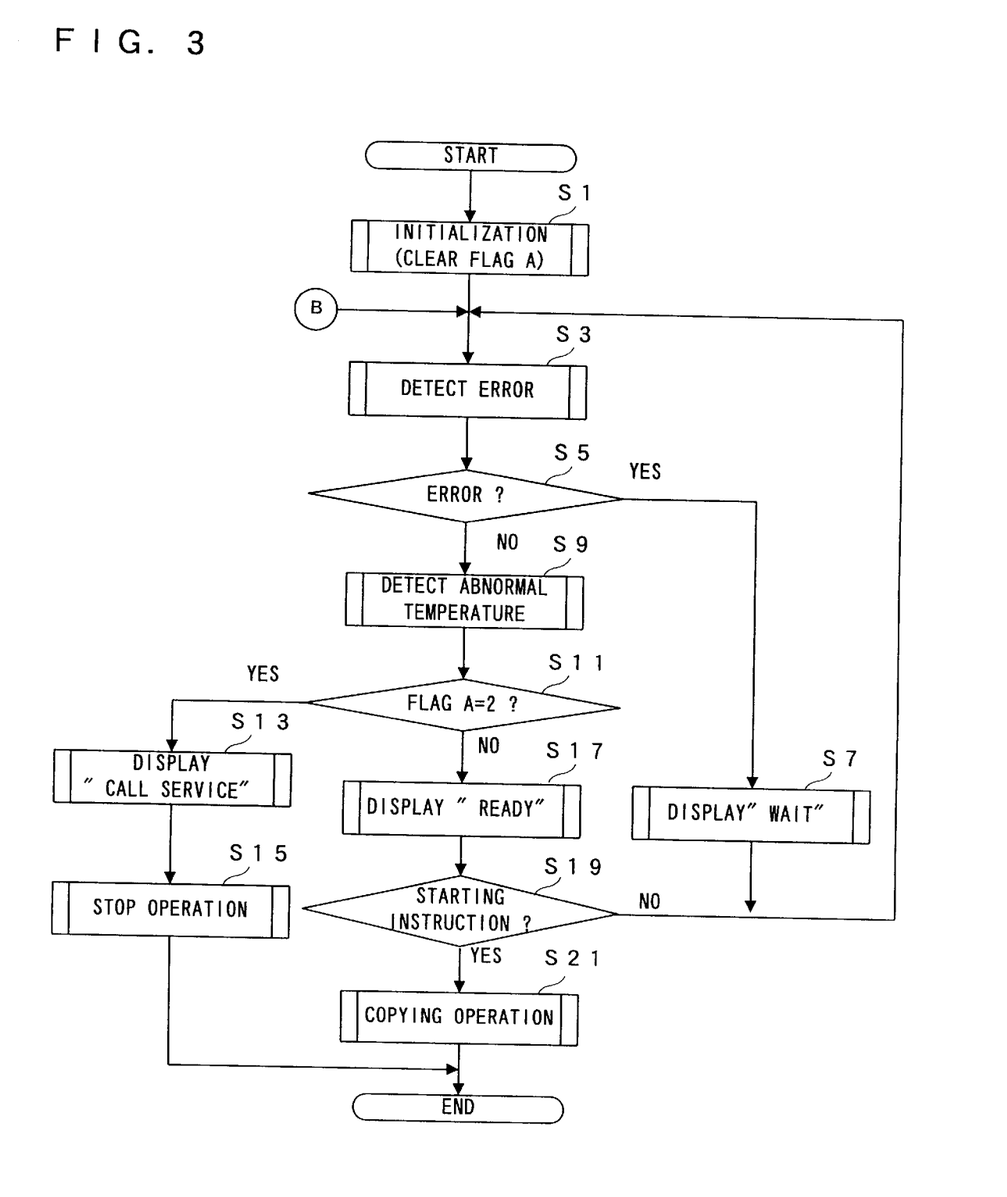
FIG. 3 is a schematic flowchart showing all operations of the embodiment.

Now, the operation of the above embodiment will be explained with reference to flowcharts in FIG. 3 and the subsequent. FIG. 3 is a flowchart showing an outline of operation, wherein at a step S1 the CPU 54 executes initialization. That is, a detection temperature flag A of the RAM 62 is cleared off at the step S1. At a next step S3, the CPU 54 checks the operations of the keys on an operation board (not shown) to determine at a subsequent step S5 whether an error has been detected or not. In case where an error is detected, the process proceeds to a step S7 where the CPU indicates "WAIT" on the display panel 76 and thereafter performs processing for the error according to an error detection program in the RAM 62.

If no error is detected at the step S5, it is determined at a next step S9 whether the output of the thermistor 52 falls within the abnormal temperature range or not. At a next step S11, it is determined whether or not the detection temperature flag A of the RAM 62 is "2". That is, it is determined at the step S11 based on the output of the thermistor 52 whether or not the temperature at around the first reading position reaches the abnormal temperature range or not. When the output of the thermistor 52 lies within the abnormal temperature range, the CPU 54 indicates, for example, "SERVICE CALL" on the display panel 76 at a step S13. Then, all the operations are suspended at a next step S15.

On the other hand, it is determined at the step S11 that the detection temperature flag A is not "2", the process proceeds to a step S17 to indicate "READY" on the display panel 76. At a next step S19, it is determined whether or not instruction information for starting copy operation has been inputted.

If the copy mode is designated by a start button or the like, copy operation is performed at a next step S21 as explained below.

Figure 4:
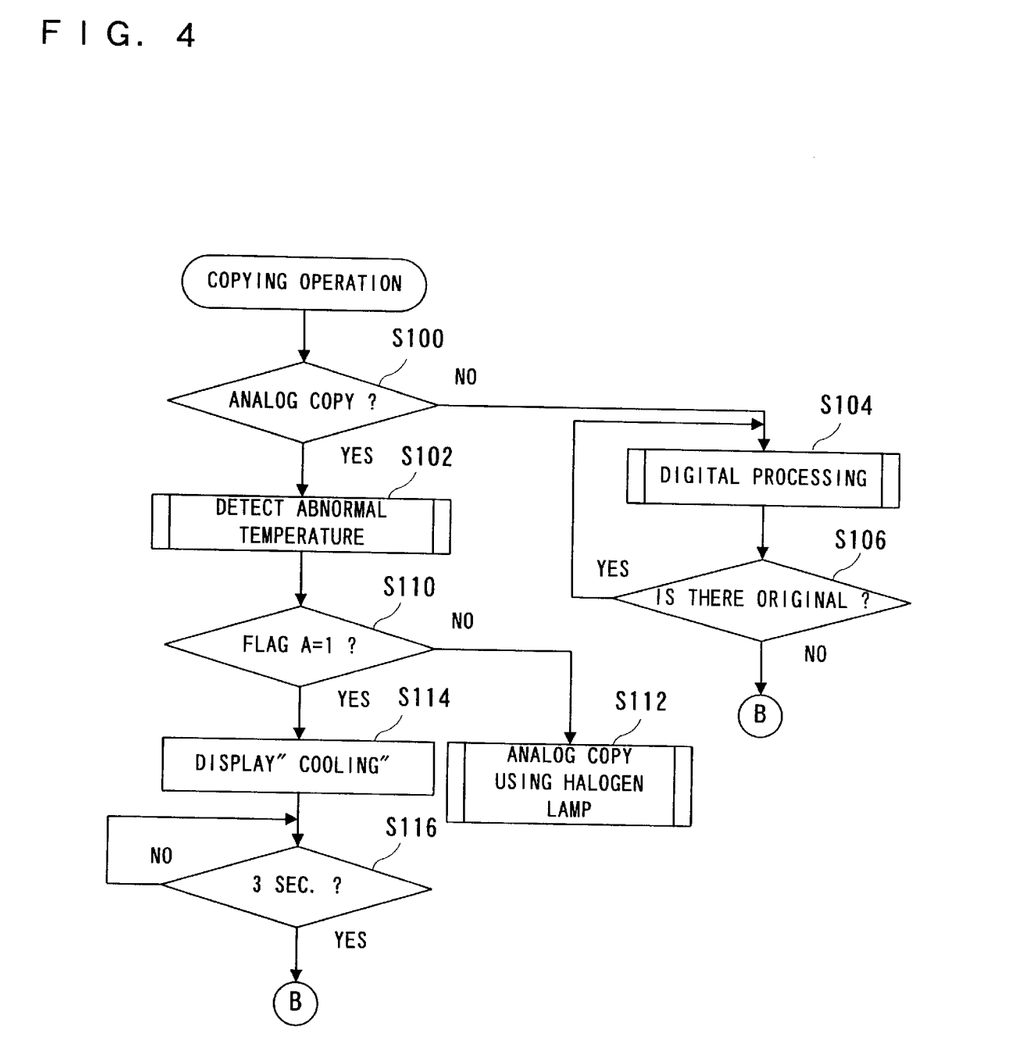
FIG. 4 is a flowchart showing operation when a copy mode is instructed.
Figure 5:
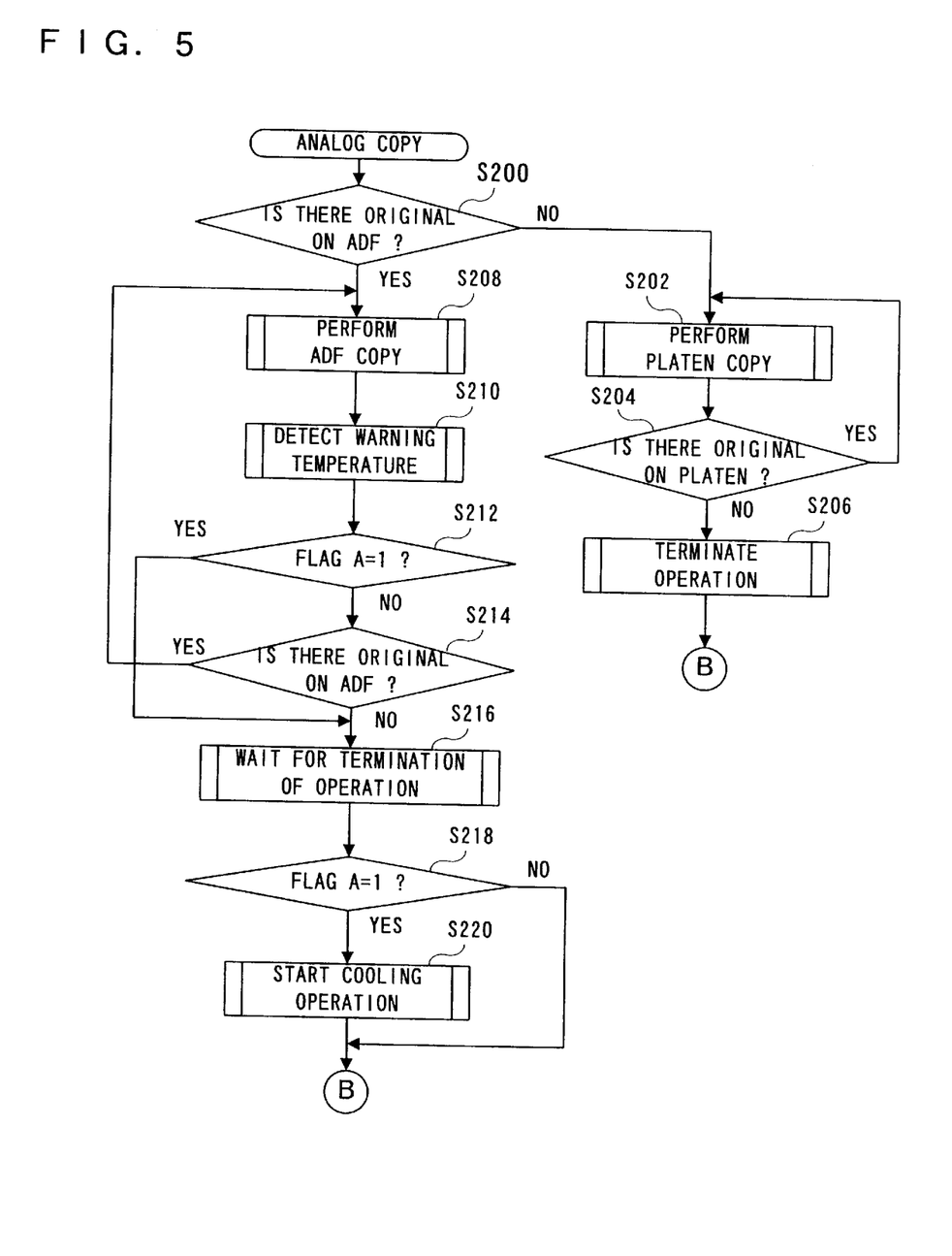
FIG. 5 is a flowchart showing operation when an ADF analog copy mode is instructed.
Figure 7:
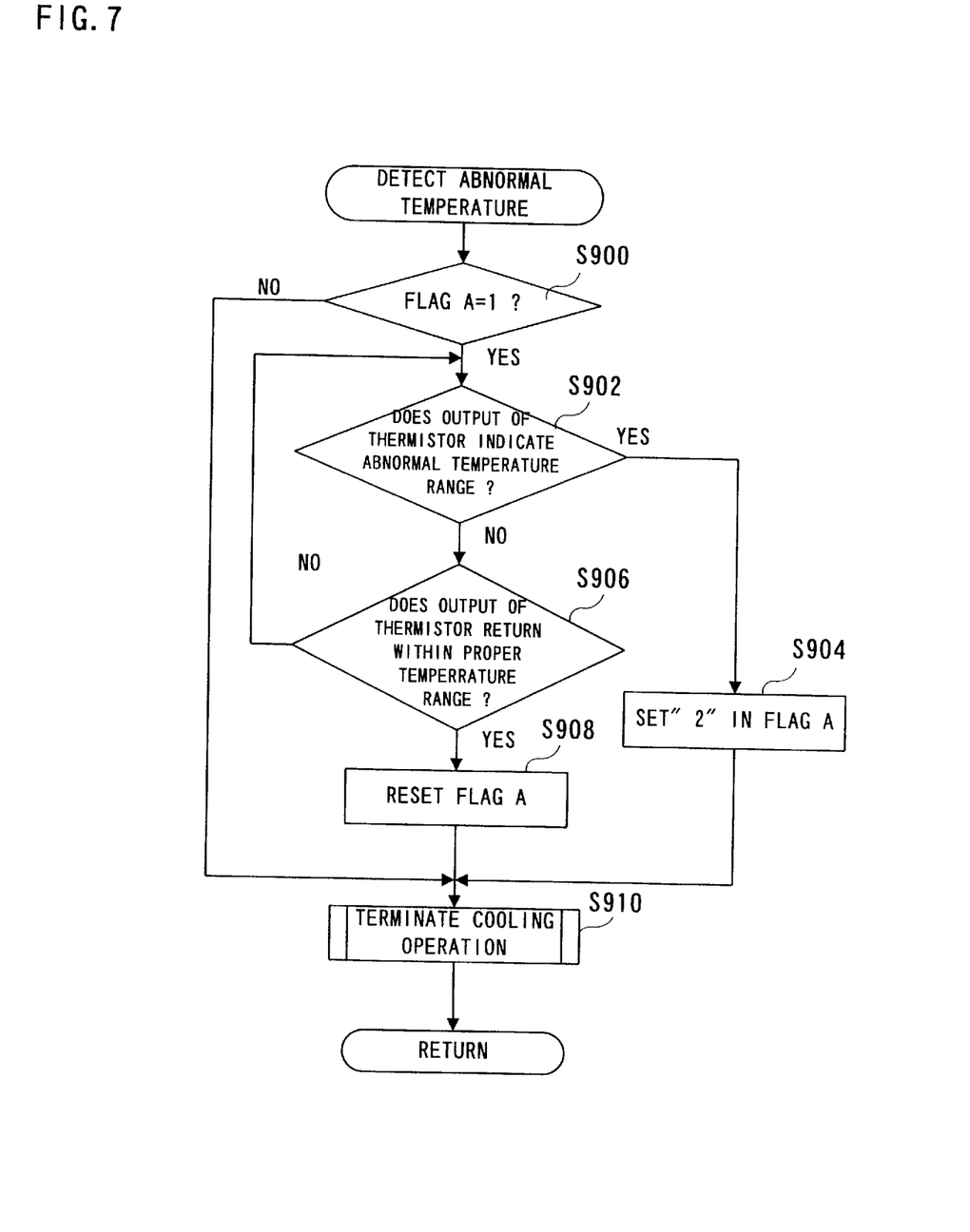
FIG. 7 is a flowchart showing operation of abnormal temperature detection.

The step S21 in FIG. 3 is shown in detail in FIG. 4 and FIG. 5. At a first step S100 in FIG. 4, the CPU 54 determines whether or not the mode designated by a selecting button, not shown, is the analog copy mode that uses the halogen lamp 40. If the determination at the step S100 is "YES", a temperature detecting process, hereinafter referred to in FIG. 7, is performed at a step S102. That is, at the step S102 it is determined whether the output of the thermistor 52 is within the abnormal temperature range.

Meanwhile, when the determination at the step S100 is "NO", that is, a digital copy mode or a facsimile transmission mode other than analog copying is designated, the process proceeds to a step S104 where the mode thus designated is carried out according to a predetermined control program. That is, the original 22 is read out by using the CIS 38. At a next step S106, the CPU 54 determines based on the output of the ADF sensor 26 whether there is present an original 22 to be subsequently read out or not.

Where abnormal temperature detection is executed at the step S102, the CPU 54 determines at a next step S110 whether or not the temperature detection flag A is "1". That is, the CPU 54 determines whether the output of the thermistor 52 reaches the warning temperature range or not. If the determination at the step S110 is "YES", the process proceeds to a step S114, where the CPU 54 indicates "COOLING" on the operation panel, as required. At a next step S116 it is determined whether a predetermined time period (e.g. 3 seconds) has elapsed from the indication or not. If the predetermined time period has elapsed, the indication is ended and the process proceeds to a step S3 in FIG. 3.

On the other hand, if the determination at the step S110 is "NO", i.e. where the temperature detection flag A is not "1", the process proceeds to a step S112 where analog copy processing is performed according to the flowchart in FIG. 5.

At a first step S200 in FIG. 5, the CPU 54 determines whether there present are originals 22 in the paper feeding tray 20 or not. That is, the determination is whether or not the original 22 is copied. If the determination at the step S200 is "NO", so-called platen copying is carried out at a step S202 wherein an original placed on the glass platen 14 is illuminated by the halogen lamp 40 that is moving at a predetermined speed. After predetermined read out (copying) is done at the step S202, it is determined at a next step S204 whether an original 22 to be next copied is rested on the glass platen 14 or not. If the determination at the step S204 is "NO", the copy operation is ended at a next step S206 and the process proceeds to a step S3 (see FIG. 3).

If "YES" is determined at the step S200, that is, if the CPU 54 (ADF sensor 26) confirms the original 22 to be placed in the paper feeding tray 20, ADF analog copying is carried out according to the control program in the RAM 62 at a next step S208. It is then determined at a next step S210 whether the output of the thermistor 52 is within the warning temperature range.

Figure 6:
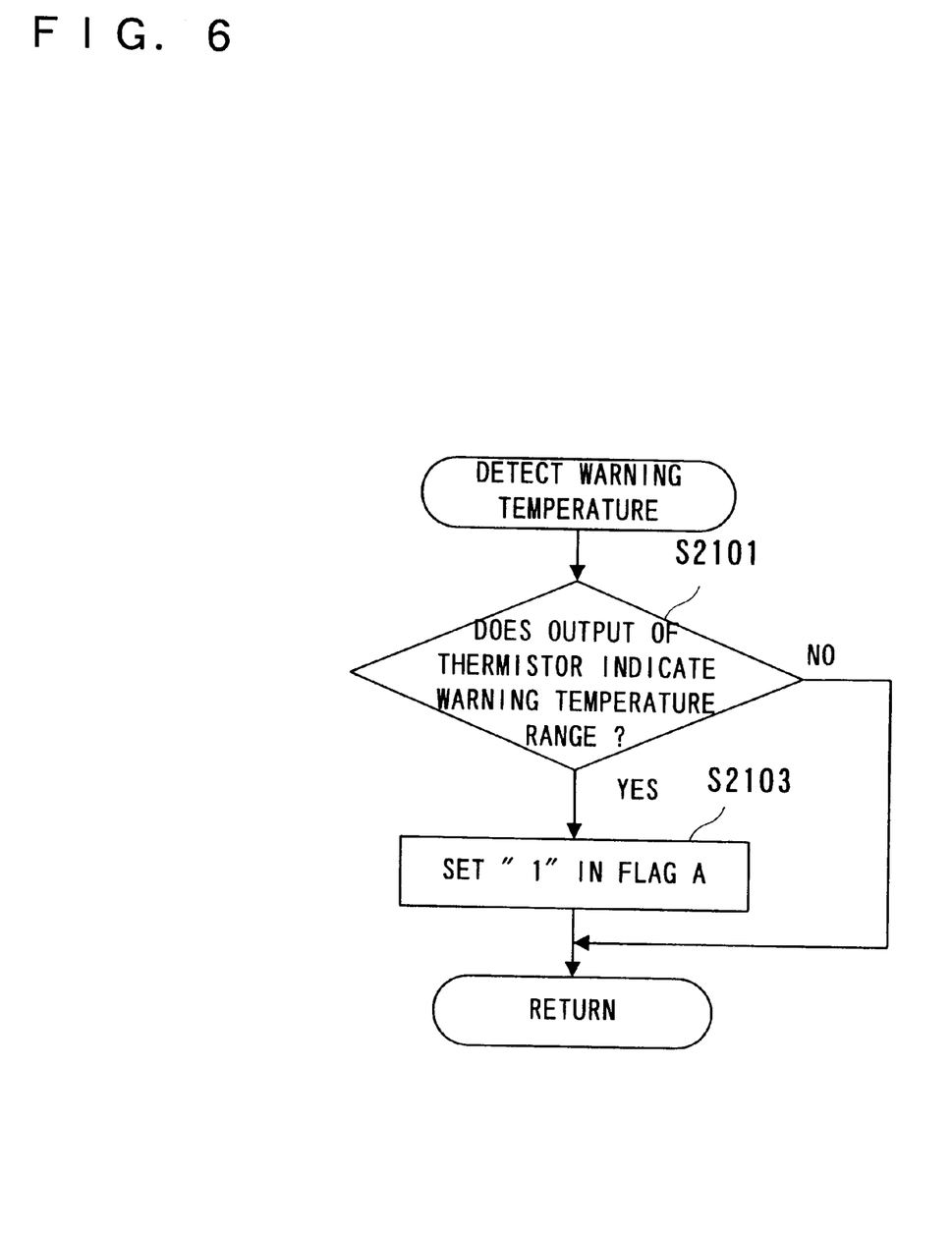
FIG. 6 is a flowchart showing operation of warning temperature detection.

That is, this step S210 is shown in FIG. 6. At a step S2101 in FIG. 6, it is determined whether the output of the thermistor 52, i.e. the temperature around the first reading position, lies within the warning temperature range or not. If "YES" is determined at this step S2101, i.e. if the detected temperature has reached the warning temperature range, the detection temperature flag A is set at "1" at a next step S2103. Then, the process proceeds to a step S212 in FIG. 5.

At the step S212 in FIG. 5 it is determined whether the detection temperature flag A is "1" or not. If the determination is "NO", it is determined at a next step S214 whether there is an original 22 in the paper feeding tray 20 or not. If the determination at the S214 is "YES", the process proceeds to a step S208 to the step S214.

If it is determined at the step S212 that the output of the thermistor 52 has reached the warning temperature range ("YES"), the process proceeds to a step S216 where the original reading apparatus 10 enters into a standby state until a series of ADF analog copy operations such as original reading being performed. That is, when the CPU 54 detects the warning temperature reached, it first disables the separator 18 to terminate feeding of an original 22. The processes of a succeeding step S218 and the subsequent are suspended during a time period corresponding to the time period of from detection of the tip end of the last-fed original 22 by the original sensor 36 to the discharge of the same original 22 through the discharge port 48 or to the discharge of after printing an image read by the original reading portion 42 on a recording paper. That is, the CPU 54 includes a time counter (not shown). The process of the step S218 and the subsequent are prohibited until the time counter is counted up.

At the step S218 it is determined whether the detection temperature flag A is "1" or not, similarly to the step S212. If "YES" is determined, cooling operation is performed at a next step S220. That is, a cooling fan 56 as a cooling means is activated. Then, the process proceeds to a step S3 in FIG. 3 where detection of an error is done as stated before. If the absence of an error is confirmed at a next step S5, abnormal temperature detection is carried out.

This step S9 is shown in detail in FIG. 7. At a first step S900 in FIG. 7, it is determined whether the detection temperature flag A is "1" or not. If the determination is "YES", it is determined at a next step S902 whether the output of the thermistor 52 is within the abnormal temperature range or not. If the determination at the step S902 is "YES", the detection temperature flag A is set at "2" at a step S904.

On the other hand, if "NO" is determined at the step S902, the process proceeds to a step S906, where it is determined whether the output of the thermistor 52 is within the proper temperature range or not. That is, it is determined whether or not the temperature around the first reading position is lowered to the proper temperature range, in which range no adverse affection is imposed upon operation of the apparatus itself or original reading, etc., by the cooling fan 56 activated at the step S220 in FIG. 5. If "YES" is determined at the step S906, that is, if it is confirmed that the output of the thermistor 52 is within the proper temperature range, the detection temperature flag A is reset at a next step S908, followed by disabling the cooling fan 56 at a step S910.

Then, the process proceeds to a step S11 in FIG. 3. If "NO" is determined at the step S11, "READY" is indicated on the display panel 76 at a step S17. That is, the step S17 means that the temperature inside the apparatus is lowered down to the proper temperature range and accordingly ADF analog copy operation is available. If instruction information for starting copy is given by depression of the start button or the like, it is possible to perform copying by the step S21.

In the present embodiment, the temperature at the position illuminated by the halogen lamp 40 (light emitting means) is detected during ADEF analog copying so that, when the temperature reaches the warning temperature range, the ADEF analog copy operation is temporarily suspended to provide a cooling period. Consequently, it is possible to carry out copying without once turning off the power for the apparatus main body, differently from the conventionally apparatus. Therefore there is no fear of disappearance of facsimile reception data stored in the memory.

Furthermore, even if the original reading mode (digital copy, facsimile transmission, etc.) using the CIS 38 is designated during cooling operation as in the above embodiment, it is convenient if ordinary reading is done. Further, where a mode utilizing the halogen lamp 40 is designated during cooling, if the message indication period showing the designated mode is unavailable is limited (3 seconds in the above embodiment), there is less possibility of misunderstanding the mode of digital copy, etc., is similarly not available.

Figure 8:
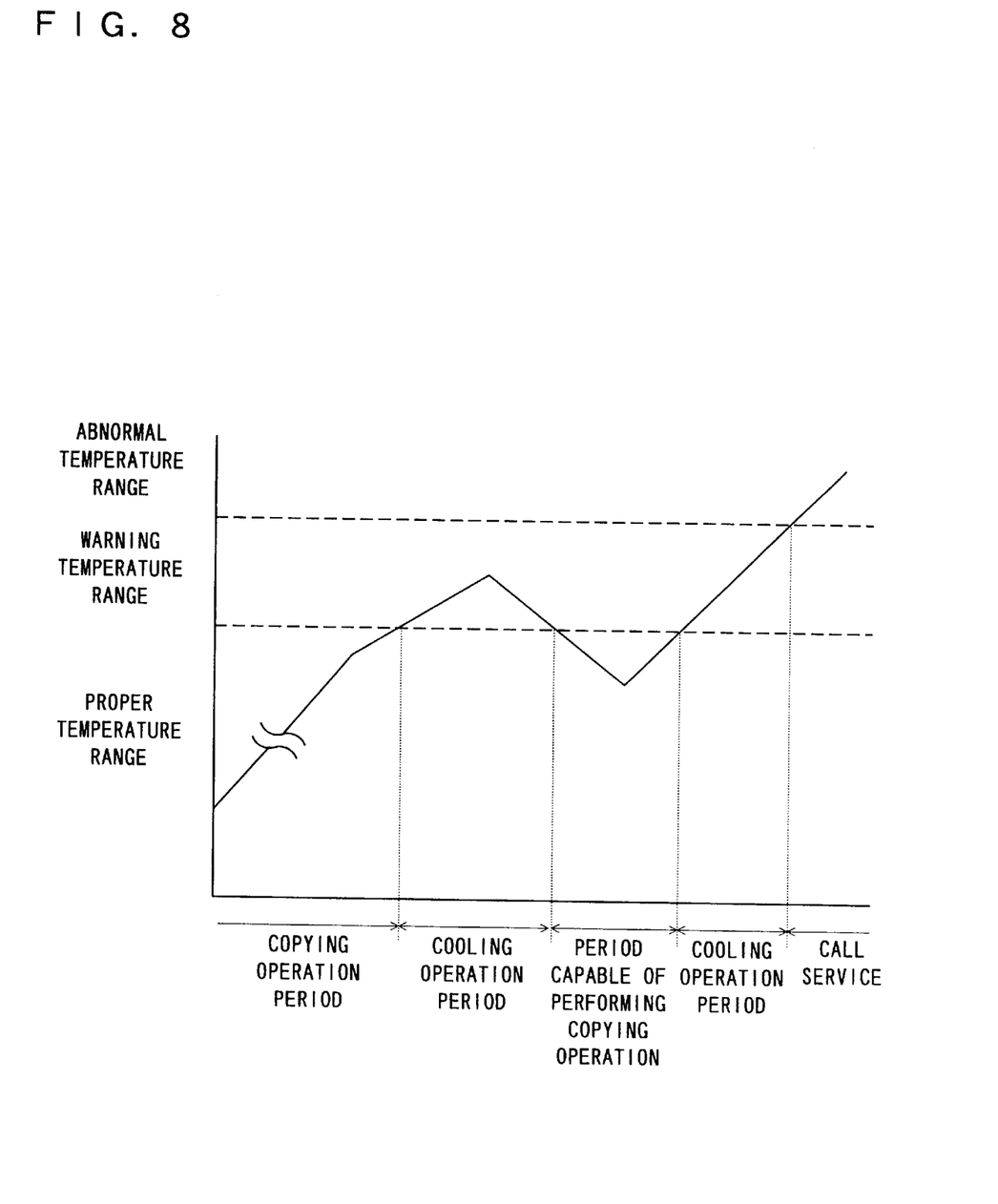
FIG. 8 is a graph showing the relationship between detection results by a thermistor (temperature detecting means) and processing performed by an CPU.

There may be a case as shown in FIG. 8 that the temperature rises to reach the abnormal temperature range in spite of during the cooling period. This is due to such erroneous operations that the halogen lamp 40, that has to be disabled, left lit or the cooling fan 56 that has to be activated, is not in operation, after the CPU 54 determines the output of the thermistor 52 is within the warning temperature range. In such a case, abnormality is notified by the display panel 76 to the operator.

Incidentally, it can be read from a graph in FIG. 8 that copying is available after a time point that the output of the thermistor 52 enters from the warning temperature range into the proper temperature range. However, it is preferred in actual reading apparatus that the cooling fan 56 (cooling means) is disabled to resume copy operation by waiting for further lowering in the temperature after the output of the thermistor 52 enters the proper temperature range.

Although in the above embodiment a semiconductor laser was employed to form an electrostatic latent image on a photosensitive material in accordance with reception data, it is needless to say that the present invention is applicable also to an original reading apparatus using, for example, LED arrays as an optically-writing light source.

Furthermore, the above embodiment employed a halogen lamp as the first light emitting means. However, other light sources that generate heat by illumination or radiation of light, i.e., heat-generating light sources, such as a fluorescent lamp, a gas-filled lamp, or a gas laser, may also be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An original reading apparatus comprising:
a paper feeding means for feeding an original to first and second reading positions;
a first light emitting means for radiating first light to a readout surface of the original positioned at the first reading position;
a second light emitting means for radiating second light onto the readout surface of the original positioned at the second reading position;
a temperature detecting means for detecting a temperature of a temperature detecting position located in the vicinity of the first reading position to be radiated by the first light;
a determining means for determining whether or not a result of detection by said temperature detecting means lies within an operation-prohibiting temperature range;
a disabling means for disabling at least said first light emitting means based on the result of determination by said determining means; and
a cooling means for cooling the position radiated by the first light based on the result of determination by said determining means.

2. An original reading apparatus according to claim 1, wherein said first light emitting means includes a heat generating light source.

3. An original reading apparatus according to claim 1, wherein the operation-prohibiting temperature range includes a warning temperature range and an abnormal temperature range,
wherein said disabling means and said cooling means are enabled when the result of detection by said temperature detecting means lies within the warning temperature range, while said disabling means is enabled when the result of detection by said temperature detecting means rise within the abnormal range.

4. An original reading apparatus according to any of claims 1 to 3, further comprising a means for canceling a state that at least said first light emitting means is disabled by said disabling means when the result of detection by said temperature detecting means enters from the warning temperature range to a proper temperature range.

5. An original reading apparatus according to any of claims 1 to 3, further comprising a recognizing means for recognizing whether or not the original is delivered to the first reading position by said paper feeding means, wherein at least said first light emitting means is disabled after lapse of a predetermined time period from recognition of the absence of an original delivered to the first reading position by said recognizing means after said determining means determines that the result of detection by said temperature detecting means lies within the warning temperature range.

6. An original reading apparatus according to claim 3, wherein the proper temperature range, the warning temperature range and the abnormal temperature range are satisfied by a relationship as the proper temperature range<the warning temperature range<the abnormal temperature range.

7. An original reading apparatus according to claim 1, further comprising a display means for indicating, for a predetermined time period, that said first light emitting means is in a disabled state when instruction information for activating said first light emitting means is inputted during the time period said first light emitting means is disabled.

8. An original reading apparatus according to claim 6, wherein when instruction information for activating said second light emitting means is inputted during a time period said first light emitting means is disabled, said second light emitting means performs a predetermined original reading operation according to the instruction information.

9. A method for controlling an original reading apparatus having an original feeding means for feeding an original to first and second reading positions, a first light emitting means for radiating first light onto a readout surface of the original when positioned at the first reading position, and a second light emitting means for radiating second light to a readout surface of the original when positioned at the second reading position, comprising the steps of:
(a) a step of detecting a temperature at a temperature detecting position located in the vicinity of the first reading position to be radiated by the first light;
(b) a step of determining whether or not a result of detection by the step (a) falls within an operation-prohibiting temperature range;
(c) a step of disabling at least said first light emitting means based on the result of determination by the step (b); and
(d) a step of cooling the position radiated by the first light based on the result of determination by the step (b).

10. A control method according to claim 9, wherein the step (b) includes a step (b-1) of determining whether or not the result of detection by the step (a) falls within a warning temperature range, wherein the step (c) and the step (d) are executed when the result of detection by the step (a) is determined, at the step (d-1), to be within the warning temperature range.

11. A control method according to claim 10, wherein the step (b) includes a step (b-2) of determining whether or not the result of detection by the step (a) falls within an abnormal temperature range, wherein the step (c) is executed when the result of detection by the step (a) is determined, at the step (b-2), to be within the abnormal temperature range.

12. A control method according to any of claims 10 to 11, wherein the step (c) includes a step (c-1) for disabling a separator that separates the original from a paper feeding tray having the original rested thereon, when the result of detection by the temperature detecting means is determined at the step (b-1), to be within the warning temperature range, and a step (c-2) for performing predetermined original reading processing on the original delivered to the second reading position after completing the step (c-1), wherein at least said first light emitting means is disabled by waiting for completion of the step (c-2).

13. A control method according to claim 10, further comprising a step (e) of canceling at the step (c) at least the state wherein said first light emitting means is disabled when the result of detection at the step (a) goes from the warning temperature range to a proper temperature range.

14. A control method according to claim 13, further comprising a step (f) indicating, for a predetermined time period, whether said first light emitting means is disabled when instruction information for activating said first light emitting means is input during execution of the step (c).

15. A control method according to claim 14, further comprising a step (g) for performing predetermined original reading processing by said second light emitting means according to instruction information when instruction information for activating said second light emitting means is input during execution of the step (c).

16. A control method according to claim 15, wherein the proper temperature range, the warning temperature range and the abnormal temperature range are satisfied by a relationship of the proper temperature range<the warning temperature range<the abnormal temperature range.

* * * * *